Jan. 1, 1924. 1,479,606
J. R. IMPEY
DENTAL HANDPIECE
Filed Sept. 21, 1922
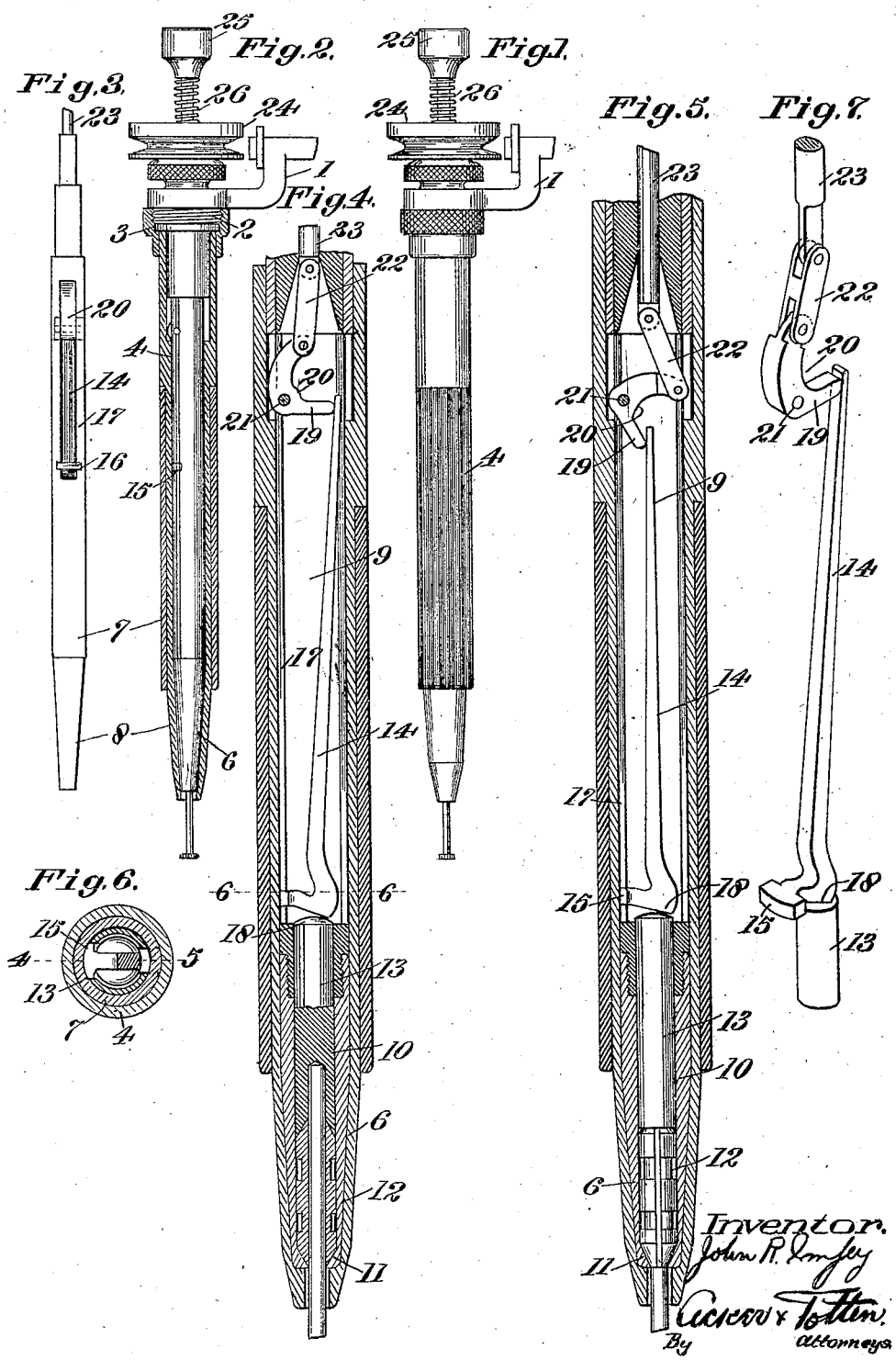

Patented Jan. 1, 1924.

1,479,606

UNITED STATES PATENT OFFICE.

JOHN R. IMPEY, OF SAN FRANCISCO, CALIFORNIA.

DENTAL HANDPIECE.

Application filed September 21, 1922. Serial No. 589,522.

*To all whom it may concern:*

Be it known that I, JOHN R. IMPEY, a citizen of the United States, residing at the city and county of San Francisco and State of California, have invented certain new and useful Improvements in Dental Handpieces, of which the following is a specification.

Dental hand-pieces as usually used by the dental profession require, when it is desired to release the burr or implement therefrom, that the dentist grasp the spindle pulley with one hand and with the other impart a rotary movement to the operating stem. This same movement with a reverse rotation to the operating stem is carried out when a new burr or implement is positioned within the hand piece.

These operations are very objectionable in that it requires the dentist to momentarily leave the patient and necessitates the resterilizing of the hands in further operations, thus considerable time is lost, which is costly to the dentist and the patient.

The present invention relates to what may be termed a single hand operated dental hand piece, whereby the dentist is enabled to grip the spindle pulley with the first and second fingers and with the thumb inwardly press the operating stem when it is desired to release an implement or burr from the chuck. If the implements are held in a container with their chuck receiving ends outwardly disposed, by my invention it is an easy matter to position the chuck over the desired implement, release the pressure on the stem and continue on with the dental operation. This one hand operation overcomes the necessity of the dentist touching any implements or tools with his other hand, and thus does not require that the other hand be again sterilized for further work.

By my present invention the work of changing the tools or implements used in a hand-piece is materially expediated and the loss of time in sterilizing the hands between each change of tools is eliminated.

With the above mentioned and other objects in view, the invention consists in the novel construction and combination of parts companying drawings and pointed out in the claims hereto appended; it being understood that various changes in the form, proportion, size and minor details of construction within the scope of the claims may be resorted to without departing from the spirit or sacrificing any of the advantages of the invention.

To more clearly comprehend the invention, reference is directed to the accompanying drawings, wherein:—

Fig. 1 is a view in side elevation of the preferred embodiment of my invention.

Fig. 2 is a similar view with the sheath illustrated in section, disclosing the spindle.

Fig. 3 is a view in side elevation of the spindle, illustrating the chuck plunger operating lever and a portion of its operating bell crank.

Fig. 4 is a longitudinal, central section illustrating the chuck, the chuck plunger, the operating lever, bell crank and toggle link within the spindle, the parts being in the position to lock the implement stem within the chuck.

Fig. 5 is a view similar to Fig. 4 with the parts in the position to release the implement stem from the chuck.

Fig. 6 is a transverse sectional view on the line 6—6 of Fig. 4.

Fig. 7 is an isometric view of the chuck plunger, chuck plunger operating lever, bell crank, toggle link and operating stem.

In the drawings, the numeral 1 indicates a conventional wrist joint frame to which is secured by a collar 2 bearing on a flange 3 the conventional and well known tubular hand piece sheath 4 formed with a corrugated gripping portion 5 and a tapered terminal end 6. Within the sheath 4 is rotatably mounted a tubular spindle 7, the outer surface of which is tapered as at 8 and the inner bore of which is formed with the respective tubular chambers 9 and 10, the lower end of the chamber 10 being conical as at 11. Within the lower end of the spindle is mounted a chuck 12 of the well known type and cooperating with this chuck is a chuck plunger 13 lineally movable hereinafter described, illustrated in the acwithin the upper end of the bore 10. The chuck plunger engages the chuck to hold the same in closed position in gripping contact with the implement stem therein.

To actuate the chuck plunger 13, I mount a chuck plunger operating lever 14 within the enlarged chamber 9 in the spindle, and the same is formed with what may be termed a laterally disposed hammer head 15 received in a recess 16 in the lower end of the slot 17 extending longitudinally of one wall of the spindle.

The surface 18 of the lever is adapted to coact with the end of the plunger 13, as in the drawings, and with the free end of said lever is adapted to coact the free arm 19 of a bell crank 20, fulcrumed as at 21 within the spindle and the opposite arm of which is connected through a toggle link 22 with the inner end of an operating stem 23. The stem 23 is mounted for lineal reciprocating movement through the upper end of the sheath and projects upwardly beyond the conventional spindle pulley 24, which is secured to the spindle to impart rotation thereto.

The upper end of the operating stem is formed with a head 25 and surrounding the stem between said head and spindle pulley is a coiled expansion spring 26, which normally moves said stem outwardly to operate the lever 14 to cause the end 18 thereof to engage the chuck plunger and operate the chuck to tightly engage the stem of the burr or implement received therein.

It will thus be apparent that but one hand of the operator is needed for changing the implement within the hand piece, and the hand piece need not be removed from that hand of the operator which he uses in working on the patient. It will also be apparent that when the operating stem is manually pressed inwardly, pressure is released on lever 14 and on plunger 13 enabling the chuck to release the implement stem, and that on the release of inward pressure on the stem, the spring 26 forces the same outwardly applying pressure to the lever 14 and chuck plunger 13 which engages the chuck 12 and thus securely locks the implement stem therein.

Having thus described my invention, what I claim as new and desire to secure by Letters Patent of the United States is:—

1. A dental hand-piece including a sheath, a hollow spindle rotatable therein, an implement holding chuck in one end of said spindle and adapted for extending to release an implement, a lineally slidable stem projecting axially from the other end of the spindle, an operating connection between the stem and chuck whereby on pressure being applied to said stem said chuck will be operated to release and a spring for acting on said chuck through said stem to retain the implement locked within the chuck on the release of pressure on said stem.

2. A dental hand-piece including a sheath, a hollow spindle rotatable therein, an implement holding chuck in one end of said spindle, a stem mounted axially within and to rotate with said spindle and adapted for lineal reciprocating movement therein, a lever within the spindle and associated with the chuck, a bell crank co-acting with the lever, a link connection between the stem and bell crank whereby said bell crank is operated on the outward reciprocation of said stem to impart pressure to said lever and a spring for moving said stem outwardly on the release of pressure therefrom and for contracting said chuck.

3. A dental hand-piece including a hollow spindle, a sheath within which the spindle is rotatably mounted, a chuck in one end of the spindle, a lineally movable chuck operating stem projecting from the other end of said spindle, said stem adapted on its inward lineal reciprocating movement to release said chuck, and means for operating said stem to lock said chuck in closed position.

4. A dental hand-piece including a hollow spindle, a sheath within which the spindle is rotatably mounted, a chuck in one end of said spindle, and associated instrumentalities within said spindle for operating said chuck, said instrumentalities including a lineally slidable operating stem projecting axially from the opposite end of the spindle and held from rotative movement therein and a spring associated with the stem for normally maintaining the chuck in closed position.

5. A dental hand-piece including a hollow spindle, a sheath within which the spindle is rotatably mounted, a chuck in one end of said spindle, a reciprocating chuck plunger, a reciprocating stem of the plunger type extended axially from the opposite end of said spindle, co-acting instrumentalities interposed within said spindle between said stem and chuck plunger for operation by reciprocation of said stem to release said chuck plunger to permit the opening of said chuck, and on the outward reciprocation of said stem to apply pressure to said chuck plunger to cause the closing of said chuck and a spring for normally operating the stem to maintain a pressure on said chuck plunger.

6. A dental hand-piece including a hollow spindle, a sheath within which the spindle is rotatably mounted, a chuck in one end of said spindle, a reciprocating chuck plunger, a reciprocating stem extended axially from the opposite end of said spindle, a spring for normally retaining said stem extended, a lever fulcrumed within said spindle for bearing on said chuck plunger, and means associated with said stem and adapted on an outward reciprocation of the stem by said spring to operate the said lever to apply pressure longitudinally to said chuck plunger.

7. A belt driven dental engine hand piece having a tool engaging clutch actuated to grip and release a tool by a lever, and means within the handpiece for actuating the lever including a lineally movable stem extending at one end beyond the end of the hand piece opposite from that mounting the tool.

In testimony whereof I have signed my name to this specification.

JOHN R. IMPEY.